(12) United States Patent
Xu et al.

(10) Patent No.: US 10,477,553 B2
(45) Date of Patent: Nov. 12, 2019

(54) AGGRESSIVE BEAM SELECTION DURING HANDOVER PROCEDURE

(71) Applicant: QUALCOMM Incorporated, San Diego, CA (US)

(72) Inventors: Huan Xu, San Diego, CA (US); Shan Qing, San Diego, CA (US); Yan Ming Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/799,832

(22) Filed: Oct. 31, 2017

(65) Prior Publication Data
US 2019/0132826 A1   May 2, 2019

(51) Int. Cl.
H04W 72/04   (2009.01)
H04W 36/08   (2009.01)
H04W 24/08   (2009.01)
H04B 7/06   (2006.01)
H04W 36/00   (2009.01)
H04W 16/28   (2009.01)
H04W 36/06   (2009.01)

(52) U.S. Cl.
CPC ........ *H04W 72/046* (2013.01); *H04B 7/0619* (2013.01); *H04B 7/0695* (2013.01); *H04W 24/08* (2013.01); *H04W 36/00835* (2018.08); *H04W 36/08* (2013.01); *H04W 16/28* (2013.01); *H04W 36/0088* (2013.01); *H04W 36/06* (2013.01)

(58) Field of Classification Search
CPC ... H04W 72/046; H04W 36/08; H04W 24/08; H04W 16/28
See application file for complete search history.

(56) References Cited

U.S. PATENT DOCUMENTS 9,960,830 B2 *   5/2018   Yoo ........................ H01Q 3/10
2013/0083774 A1   4/2013   Son et al.
2015/0236772 A1   8/2015   Hammarwall et al.
(Continued)

FOREIGN PATENT DOCUMENTS

WO   WO-2017020688 A1   2/2017

OTHER PUBLICATIONS

International Search Report and Written Opinion—PCT/US2018/058523—ISA/EPO—dated Jan. 7, 2019.
(Continued)

*Primary Examiner* — Ahmed Elallam
(74) *Attorney, Agent, or Firm* — Patterson & Sheridan, LLP

(57) ABSTRACT

Methods and apparatus are provided for aggressive beam selection during a handover procedure. A User Equipment (UE) measures a plurality of candidate downlink beams of a target base station (BS), wherein measurement opportunities for each of the candidate downlink beams are scheduled periodically. The UE reports measurements relating to one or more of the measured candidate downlink beams to a source BS. The UE receives a command to handover to the target BS, and in response to receiving the command, attempts to find a new downlink beam of the target BS having a corresponding measurement opportunity that is earlier than a next measurement opportunity of one of the one or more candidate downlink beam.

28 Claims, 10 Drawing Sheets

(56) References Cited

U.S. PATENT DOCUMENTS

| | | | |
|---|---|---|---|
| 2016/0255548 A1 | 9/2016 | Cedergren et al. | |
| 2017/0055187 A1 | 2/2017 | Kang et al. | |
| 2017/0215117 A1 | 7/2017 | Kwon et al. | |
| 2017/0230849 A1 | 8/2017 | Wei et al. | |
| 2017/0230869 A1 | 8/2017 | Kubota et al. | |
| 2017/0331670 A1* | 11/2017 | Parkvall | H04W 52/0274 |
| 2017/0366992 A1* | 12/2017 | Rune | H04L 5/0016 |
| 2018/0167883 A1* | 6/2018 | Guo | H04W 76/27 |
| 2018/0176801 A1* | 6/2018 | Rune | H04B 7/0695 |
| 2018/0241461 A1* | 8/2018 | Jalali | H04B 7/18502 |
| 2019/0007123 A1* | 1/2019 | Rune | H04B 7/0834 |
| 2019/0116530 A1* | 4/2019 | Da Silva | H04W 36/0094 |

OTHER PUBLICATIONS

Samsung: "Measurements for Cell-level Mobility in High Frequency NR", 3GPP Draft; R2-165150, 3rd Generation Partnership Project (3GPP), Mobile Competence Centre; 650, Route Des Lucioles; F-06921 Sophia-Antipolis Cedex, France, vol. RAN WG2, no. Goteborg; Aug. 22, 2016-Aug. 26, 2016, Aug. 21, 2016 (Aug. 21, 2016), pp. 1-4, XP051126767, Retrieved from the Internet: URL: http://www.3gpp.org/ftp/Meetings_3GPP_SYNC/RAN2/Docs/ [retrieved on Aug. 21, 2010] Sections 2.1, 2.2.

* cited by examiner

AGGRESSIVE BEAM SELECTION DURING HANDOVER PROCEDURE

FIELD

The present disclosure relates generally to wireless communication systems, and more particularly, to methods and apparatus for selecting a downlink beam of a target base station during a handover procedure for handover to the target base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes measuring a plurality of candidate downlink beams of a target BS, wherein measurement opportunities for each of the candidate downlink beams are scheduled periodically, reporting measurements relating to one or more of the measured candidate downlink beams to a source BS, receiving a command to handover to the target BS, and in response to receiving the command, attempting to find a new downlink beam of the target BS having a corresponding measurement opportunity that is earlier than a next measurement opportunity of one of the one or more candidate downlink beam.

Certain aspects of the present disclosure provide an apparatus for wireless communications by a User Equipment (UE). The apparatus generally includes means for measuring a plurality of candidate downlink beams of a target base station (BS), wherein measurement opportunities for each of the candidate downlink beams are scheduled periodically, means for reporting measurements relating to one or more of the measured candidate downlink beams to a source BS, means for receiving a command to handover to the target BS, and means for, in response to receiving the command, attempting to find a new downlink beam of the target BS having a corresponding measurement opportunity that is earlier than a next measurement opportunity of one of the one or more candidate downlink beams.

Certain aspects of the present disclosure provide an apparatus for wireless communications by a User Equipment (UE). The apparatus generally includes at least one processor and a memory coupled to the at least one processor. The at least one processor is generally configured to measure a plurality of candidate downlink beams of a target base station (BS), wherein measurement opportunities for each of the candidate downlink beams are scheduled periodically, report measurements relating to one or more of the measured candidate downlink beams to a source BS, receive a command to handover to the target BS, and in response to receiving the command, attempt to find a new downlink beam of the target BS having a corresponding measurement opportunity that is earlier than a next measurement opportunity of one of the one or more candidate downlink beams.

Certain aspects of the present disclosure provide a computer-readable medium for wireless communications by a User Equipment (UE). The computer-readable medium generally stores instructions which when processed by at least one processor performs a method generally including measuring a plurality of candidate downlink beams of a target BS, wherein measurement opportunities for each of the candidate downlink beams are scheduled periodically, reporting measurements relating to one or more of the measured candidate downlink beams to a source BS, receiving a command to handover to the target BS, and in response to receiving the command, attempting to find a new downlink beam of the target BS having a corresponding measurement opportunity that is earlier than a next measurement opportunity of one of the one or more candidate downlink beam.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
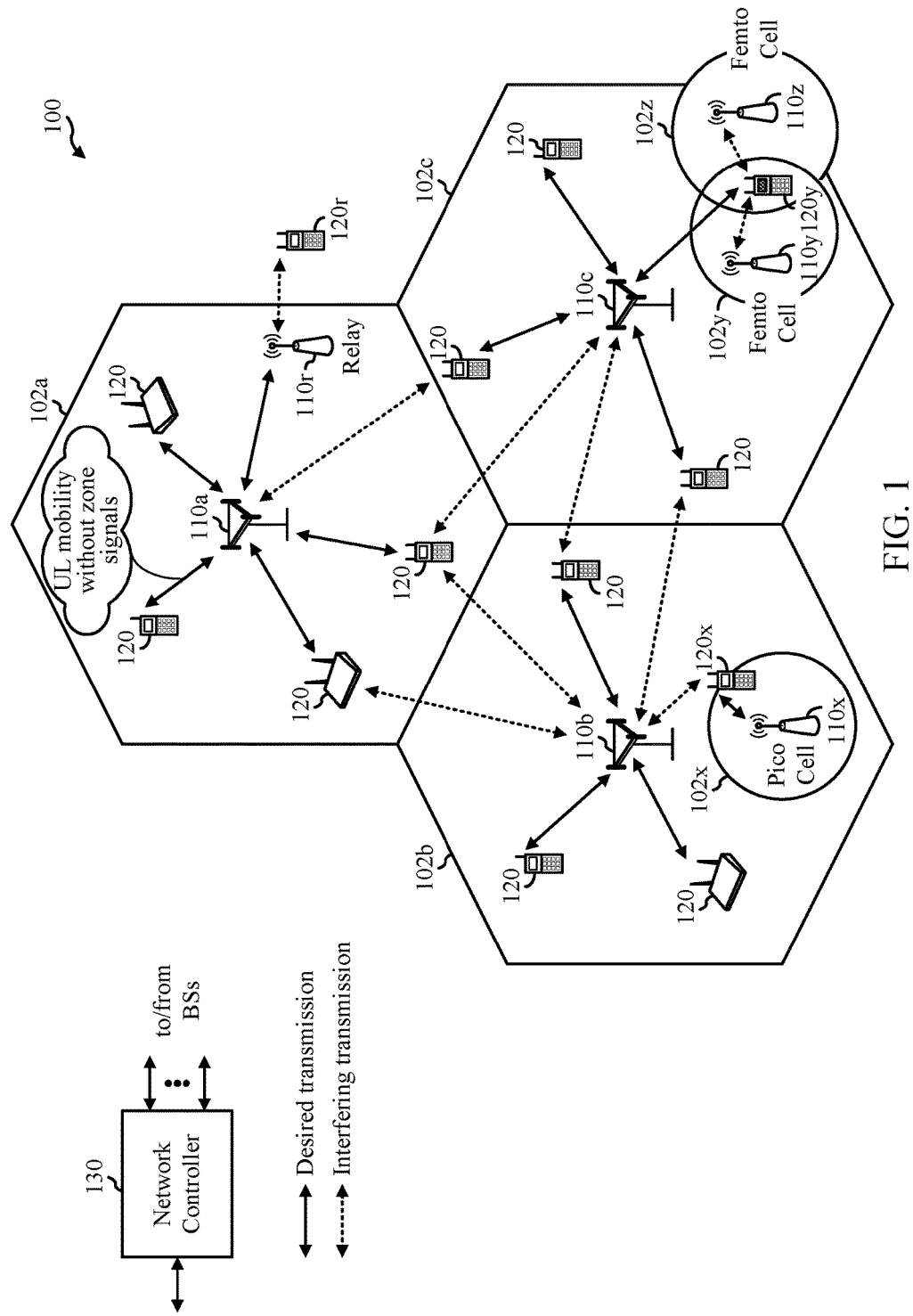
FIG. 1 is a block diagram conceptually illustrating an example telecommunications system, in accordance with certain aspects of the present disclosure.

In 5G systems, nodes (e.g., Base Stations (BS) and User Equipments (UE)) communicate using directional beams. For example, each node (e.g., BS and/or UE) uses an antenna array including one or more directional beamforming antennas capable of transmitting and/or receiving on multiple directional beams in different directions. Each node may use its antenna array to transmit and receive data on one or more directional beams from other nodes in different directions. In an aspect, each directional beam configured at the network/BS end is referred to as a 'downlink beam'. The term 'downlink beam' generally refers to a network-side directional beam used by a BS (e.g., gNB) for transmitting on the downlink as well as receiving on the uplink. In an aspect, each downlink beam may be pointed towards a particular UE and may be used for downlink and uplink communication with the particular UE.

In an aspect, each directional beam configured at the UE end is referred to as an 'Rx beam'. The term 'Rx beam' generally refers to a UE-side directional beam used by the UE for receiving on the downlink as well as transmitting on the uplink.

In certain aspects, to find a working downlink beam from a BS, a UE needs to detect and measure a downlink signal quality of one or more beams transmitted by the BS. Generally, the BS periodically transmits a unique Beam Reference Signal (BRS) corresponding to each downlink beam configured for the BS. The UE may detect and measure BRSs corresponding to one or more downlink beams to find a working downlink beam that may be paired with a UE Rx beam for communication with the B.

In certain aspects, a UE is configured to continually measure downlink beams from neighboring cells and report the measurements relating to candidate beams of the neighbor cells to the source base station. The source base station, based on the measurements, may select one of the neighbor cells for handover and command the UE to handover to the selected neighbor cell.

When the source BS initiates a handover to the target BS, for example, by issuing a handover command to the UE, the UE is generally expected to detect one of the previously measured candidate downlink beams at their known BRS locations (e.g., subframe and symbol location) based on the previous measurements and use the a detected candidate downlink beam for handover to the target BS.

Thus, once the handover is triggered, the UE has to wait until the next known BRS location of a candidate downlink beam to be able to use the downlink beam for the handover. If the candidate beams have longer repetition periods, the UE may have to wait for a considerable time period to find a candidate beam for the handover. For example, for a candidate downlink beam with 20 ms repetition period, the UE may have to wait up to 20 ms after handover is triggered to find the candidate beam. This may introduce a considerable handover delay.

Additionally, in certain cases including, for example high mobility scenarios, one or more of the candidate downlink beams may no more be good enough for reliable communication with the target BS. For example, due to the UEs changing position relative to the target BS, the quality of one or more candidate downlink beams may have deteriorated to an extent that they are no more suitable for reliable communication between the UE and the target BS.

Certain aspects of the present disclosure discuss techniques for a UE to quickly find a reliable downlink beam for handover, once handover is triggered. For example a User Equipment (UE) measures a plurality of candidate downlink beams of a target base station (BS), wherein measurement opportunities for each of the candidate downlink beams are scheduled periodically. The UE reports measurements relating to one or more of the measured candidate downlink beams to a source BS. The UE receives a command to handover to the target BS, and in response to receiving the command, attempts to find a new downlink beam of the target BS having a corresponding measurement opportunity that is earlier than a next measurement opportunity of one of the one or more candidate downlink beam.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
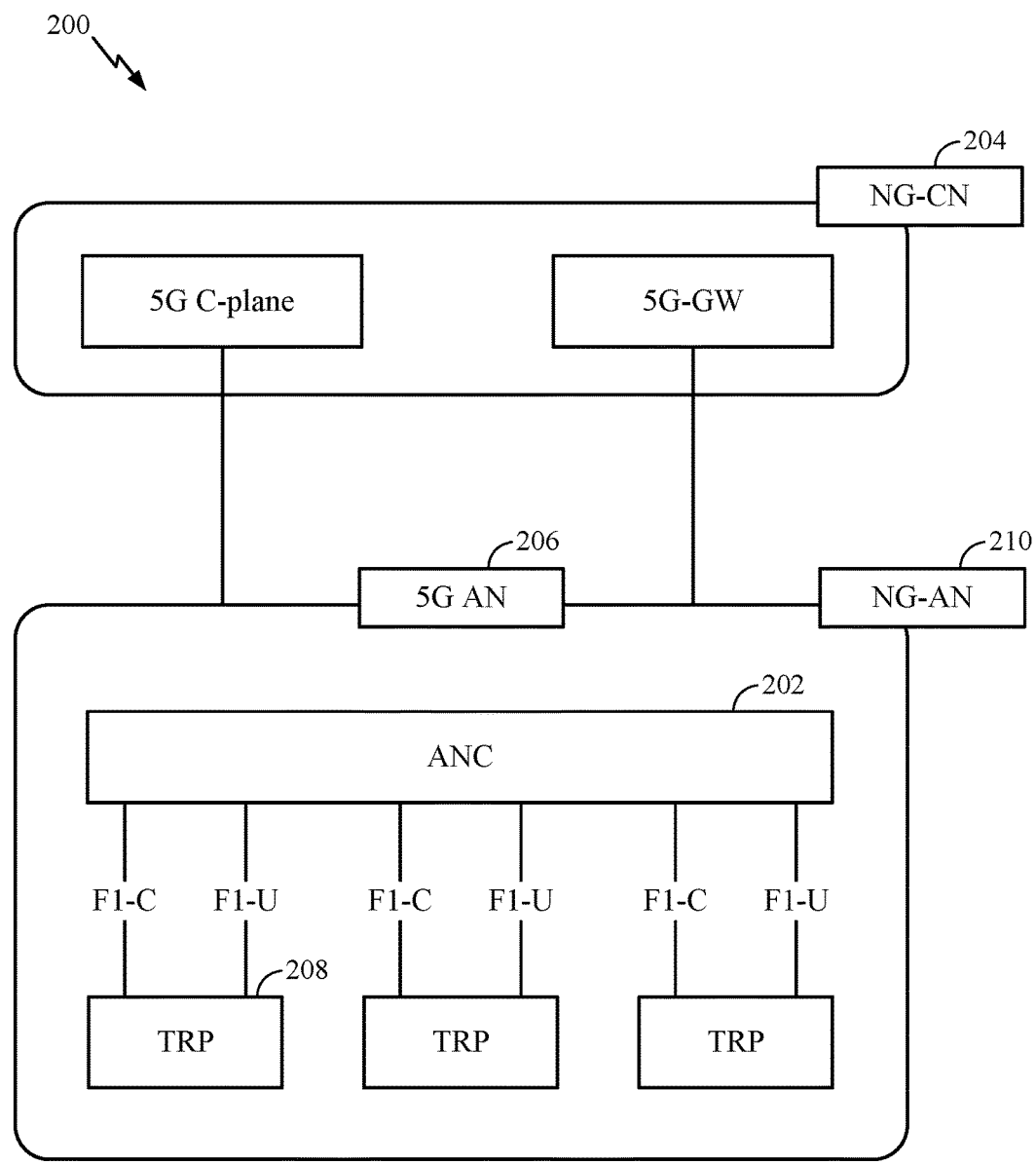
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
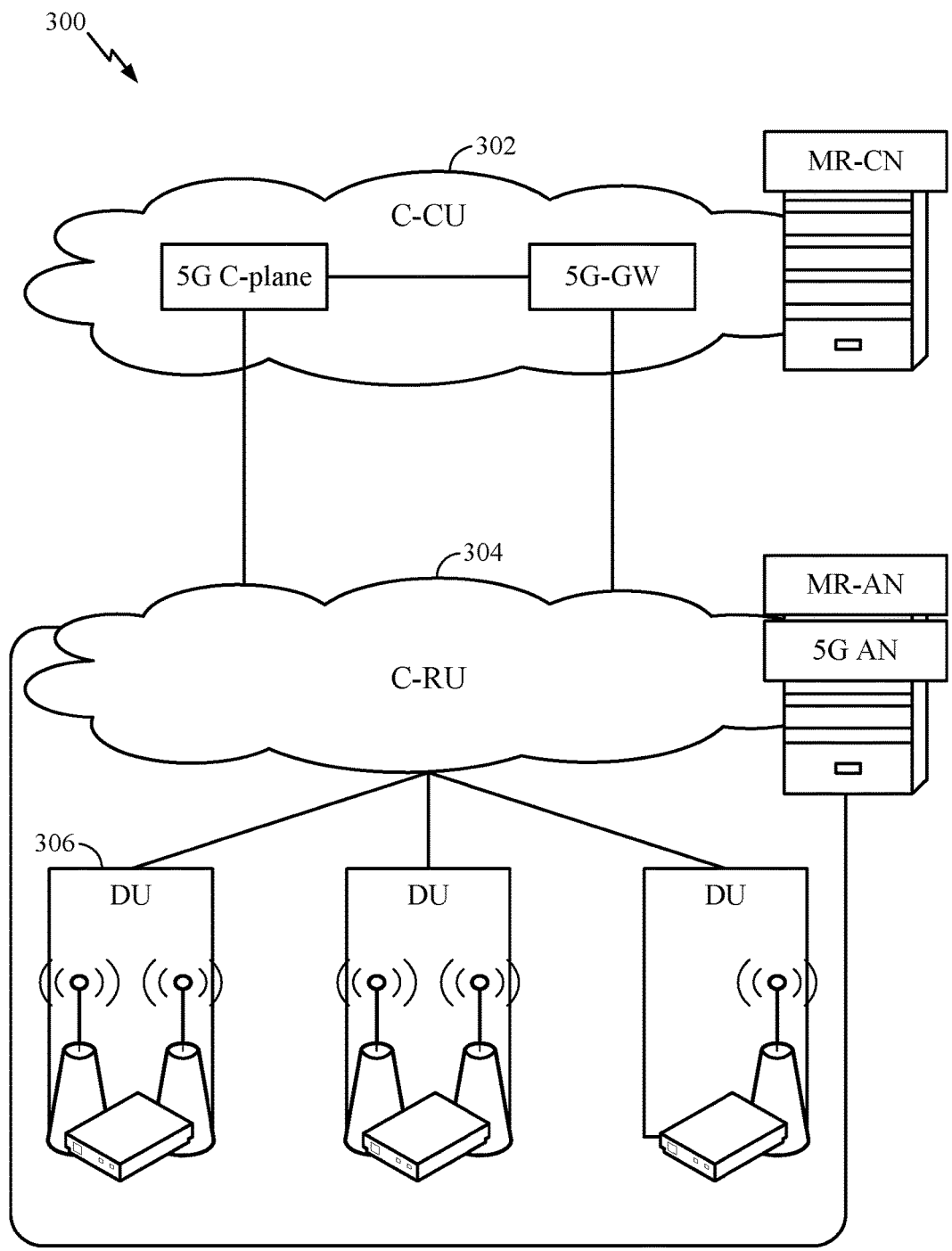
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
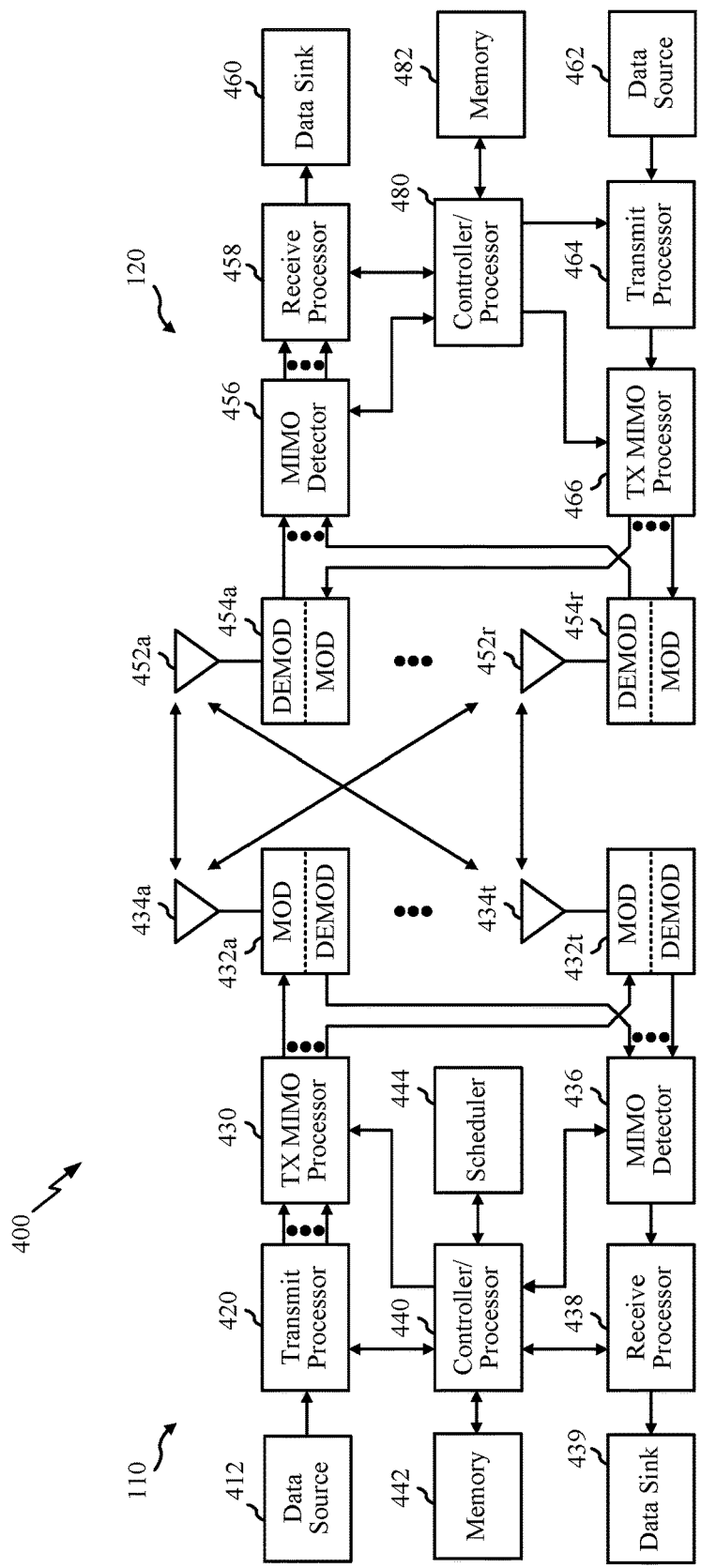
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
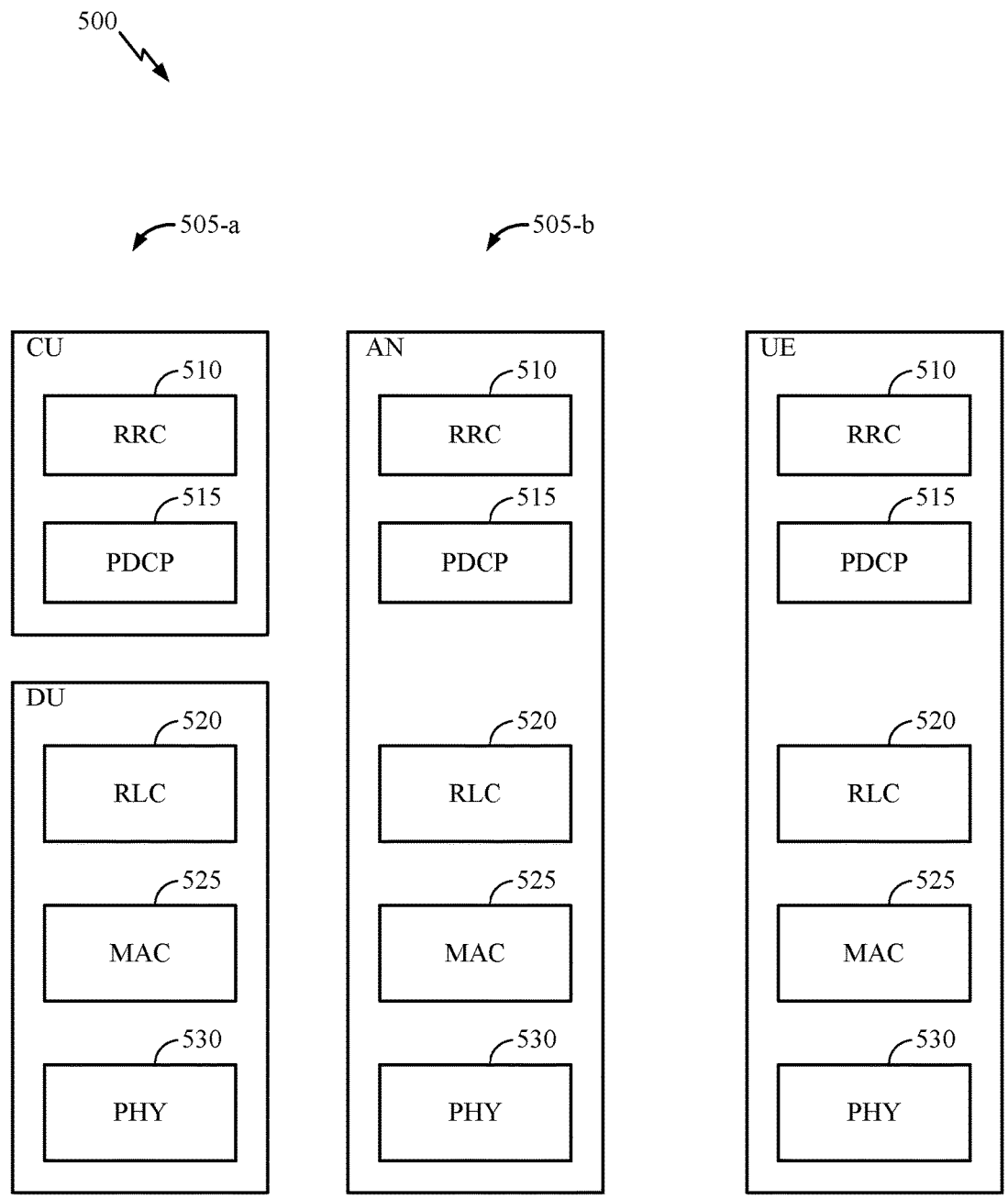
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
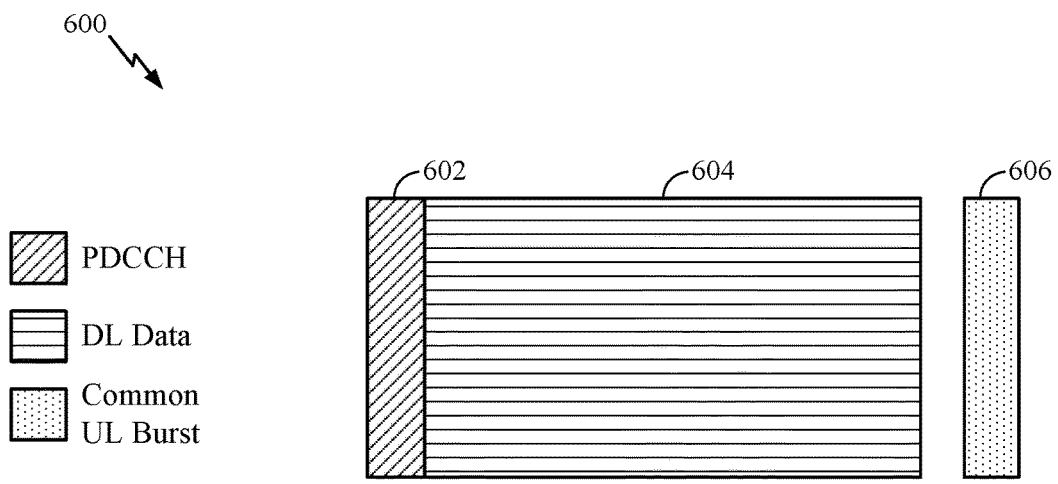
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
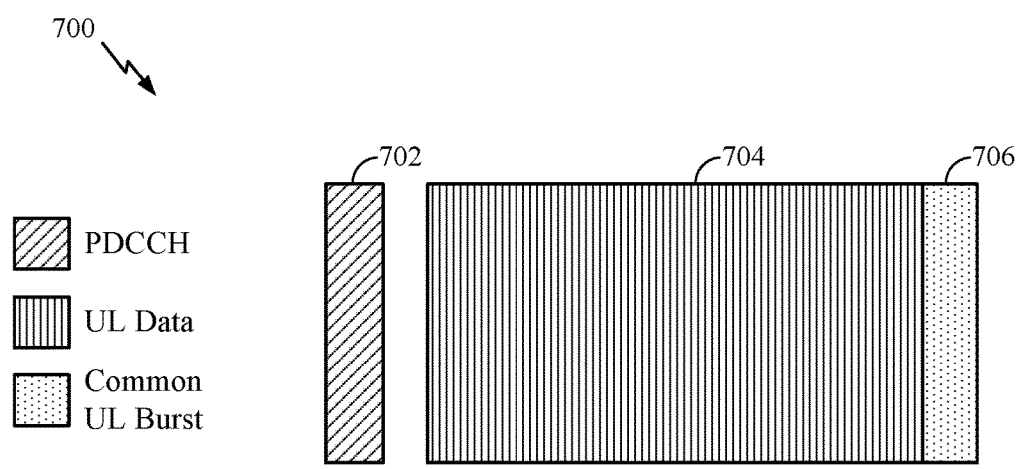
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Procedures for Aggressive Beam Selection During Handover Procedure

In 5G systems, nodes (e.g., Base Stations (BS) and User Equipments (UE)) communicate using directional beams. For example, each node (e.g., BS and/or UE) uses an antenna array including one or more directional beamforming antennas capable of transmitting and/or receiving on multiple directional beams in different directions. Each node may use its antenna array to transmit and receive data on one or more directional beams from other nodes in different directions. In an aspect, each directional beam configured at the network/BS end is referred to as a 'downlink beam'. The term 'downlink beam' generally refers to a network-side directional beam used by a BS (e.g., gNB) for transmitting on the downlink as well as receiving on the uplink. In an aspect, each downlink beam may be pointed towards a particular UE and may be used for downlink and uplink communication with the particular UE.

In an aspect, each directional beam configured at the UE end is referred to as an 'Rx beam'. The term 'Rx beam' generally refers to a UE-side directional beam used by the UE for receiving on the downlink as well as transmitting on the uplink.

In certain aspects, the UE-side antenna array is dynamically configured for downlink receiving and uplink transmission in certain directions. Generally, at least one Rx beam direction at the UE needs to be aligned with a direction of a downlink beam configured by a BS in order to achieve the best receiving and transmission qualities. In an aspect, the receiving and transmission qualities are indicated by a receiving/transmitting power, SNR etc. This matching of a UE Rx beam with a BS downlink beam is often referred to as direction pairing of Rx beam and downlink beam.

Figure 8:
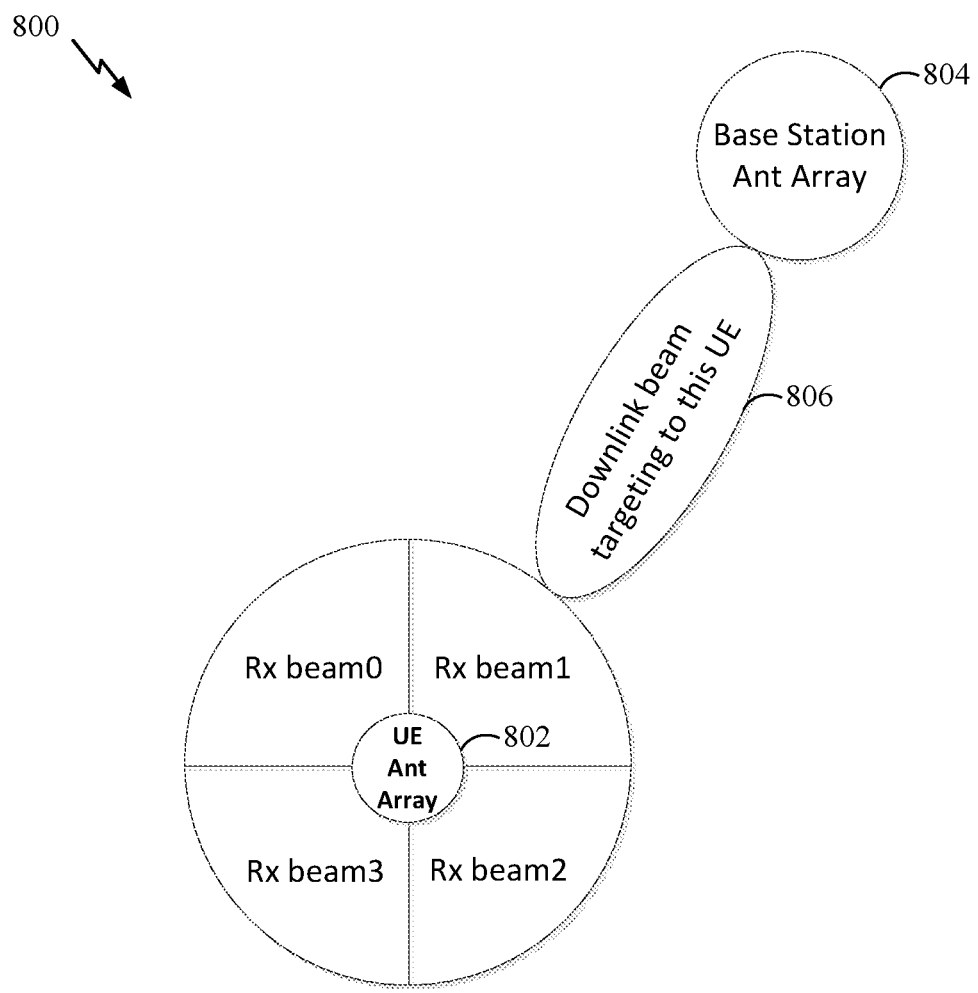
FIG. 8 illustrates an example direction pairing of a UE RX beam with a BS downlink beam, in accordance with certain aspects of the present disclosure.

FIG. 8 illustrates an example direction pairing of a UE RX beam with a BS downlink beam, in accordance with certain aspects of the present disclosure. As shown, four Rx beams (Rx 0, 1, 2, and 3) are configured at the UE end using the UE antenna array 802, one Rx beam servicing one quadrant. At the base station end a downlink beam 806 is configured using antenna array 804, the downlink beam 806 targeting the UE and pointing towards the UE. As shown in the figure, UE Rx beam 1 is paired with the BS downlink beam 806 for uplink and downlink communication between the BS and the UE.

In certain aspects, to find a working downlink beam from a BS, a UE needs to detect and measure a downlink signal quality of one or more beams transmitted by the BS. Generally, the BS periodically transmits a unique Beam Reference Signal (BRS) corresponding to each downlink beam configured for the BS. The UE may detect and measure BRSs corresponding to one or more downlink beams to find a working downlink beam that may be paired with a UE Rx beam for communication with the BS.

Figure 9:
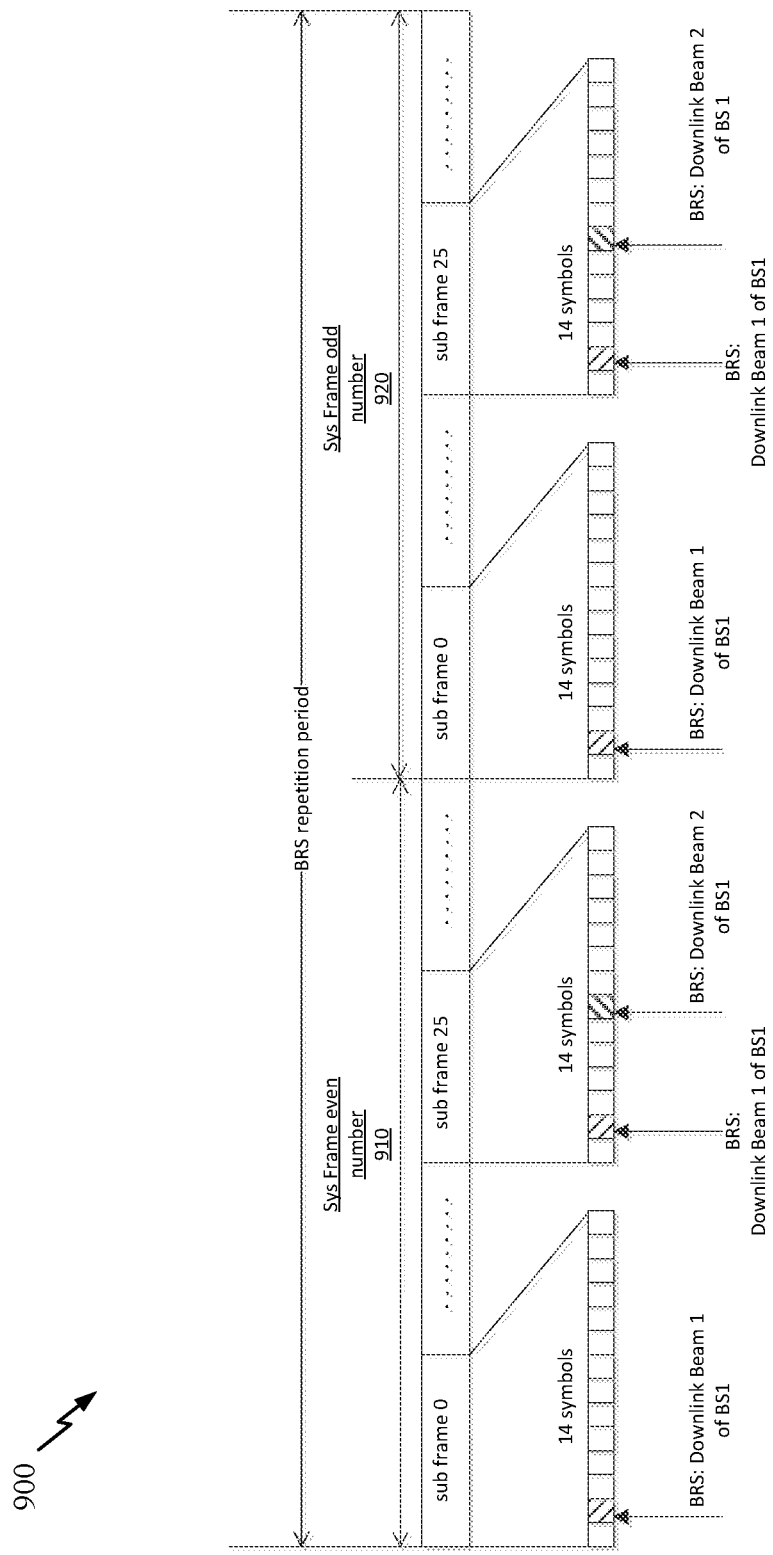
FIG. 9 illustrates an example subframe design 900 for transmission of BRS, in accordance with certain aspects of the present disclosure.

FIG. 9 illustrates an example subframe design 900 for transmission of BRS, in accordance with certain aspects of the present disclosure. As shown each system frame (e.g., system frames 910 and 920) is divided into 50 subframes (e.g., subframes 0-49), each subframe being 200 micro seconds. Each system frame includes two special subframes often referred to as synchronization or sync subframes including sync subframe 0 and sync subframe 25. A BS transmits BRSs corresponding to one or more of the BS's configured downlink beams in one or both of the sync subframes of a system frame. A UE may monitor the sync subframes to detect and measure BRSs to identify one or more downlink beams of the BS.

Each sync subframe (e.g., subframes 0 and 25) includes 14 symbols. A network may configure up to eight possible downlink beams per symbol of a sync subframe. For example, 1, 2, 4, or 8 antenna ports may be configured to transmit BRS. At the UE end, for detecting a network downlink beam, the UE may monitor one or more sync subframes and may detect a BRS at a particular symbol of the sync subframe within a system frame. In an aspect, each BRS uniquely identifies a particular downlink beam of a BS. For example, each downlink beam is identified by a beam identifier (ID). Each BRS includes a beam id of a downlink beam on which the BRS was transmitted. The BRS further includes information regarding the particular sync subframe(s) of a system frame, symbol within the sync subframe, and antenna port on which the BRS is transmitted. Once a good BRS (e.g., BRS with acceptable quality) is found in a given symbol in a sync subframe, the UE may identify the unique downlink beam, for example, based on the beam id included in the BRS.

In certain aspects, the BRS corresponding to a particular downlink beam is transmitted periodically. The time period between two BRS transmissions for the same downlink beam is referred to as the BRS repetition period. For example, the BRS corresponding to a particular downlink beam is transmitted every 2 0 ms. In this case the BRS repetition period is 20 ms and the UE expects to receive the same BRS corresponding to a particular downlink beam every 20 ms. In an aspect, the BRS includes the BRS repetition period for the BRS. For example, if the repetition period is 5 ms then a beam will be transmitted every 5 ms in the same symbol and using same antenna port, for example at subframes 0, 25, 0, 25 and so on of every system frame. In another example, for a 10 ms repetition period a beam will be transmitted once in the same subframe of every system frame, for example, in subframe 25 of frame 1, subframe 25 of frame 2 and so on. FIG. 9 shows transmission of the same BRS corresponding to a downlink beam 1 of a BS1 with a repetition period of 5 ms. As shown, the same BRS is transmitted every 5 ms in the $2^{nd}$ symbol of sync subframes 0 and 25 of every system frame. BRS corresponding to another downlink beam 2 of BS1 is transmitted with repetition period of 10 ms. As show, the same BRS is transmitted every 10 ms in the $7^{th}$ symbol of sync subframe 25 of every system subframe.

In certain aspects, a UE is configured to continually measure downlink beams from neighboring cells and report the measurements relating to candidate beams of the neighbor cells to the source base station. The source base station, based on the measurements, may select one of the neighbor cells for handover and command the UE to handover to the selected neighbor cell. In an aspect, the UE detects and measures BRSs corresponding to multiple downlink beams of a target neighbor BS and reports measurements corresponding to one or more candidate beams to the serving BS. For example, the UE only reports those candidate downlink beams that meet a threshold BRS receive signal quality. Thus, before a handover procedure is initiated to the target BS, the UE already knows one or more downlink beams of the target BS that may potentially be used for the handover. For example, based on the previous detection of BRSs corresponding to the candidate downlink beams, the UE has information regarding BRS locations and BRS repetition periods of each of the candidate downlink beams of the target BS.

When the source BS initiates a handover to the target BS, for example, by issuing a handover command to the UE, the UE is generally expected to detect one of the previously measured candidate downlink beams at their known BRS locations (e.g., subframe and symbol location) based on the previous measurements and use the a detected candidate downlink beam for handover to the target BS.

Thus, once the handover is triggered, the UE has to wait until the next known BRS location of a candidate downlink beam to be able to use the downlink beam for the handover. If the candidate beams have longer repetition periods, the UE may have to wait for a considerable time period to find a candidate beam for the handover. For example, for a candidate downlink beam with 20 ms repetition period, the UE may have to wait up to 20 ms after handover is triggered to find the candidate beam. This may introduce a considerable handover delay.

Additionally, in certain cases including, for example high mobility scenarios, one or more of the candidate downlink beams may no more be good enough for reliable communication with the target BS. For example, due to the UEs changing position relative to the target BS, the quality of one or more candidate downlink beams may have deteriorated to an extent that they are no more suitable for reliable communication between the UE and the target BS.

Certain aspects of the present disclosure discuss techniques for a UE to quickly find a reliable downlink beam for handover, once handover is triggered.

Figure 10:
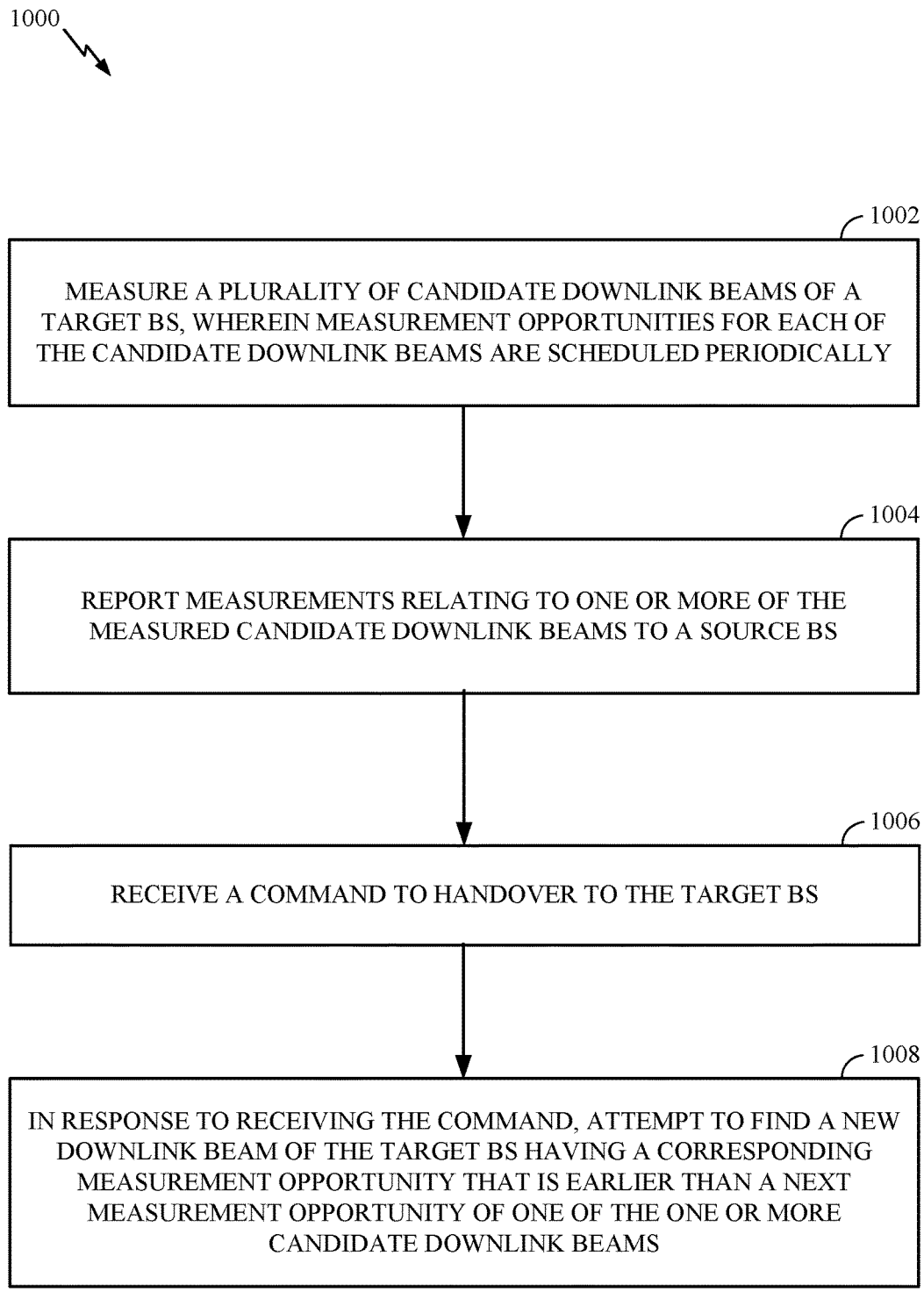
FIG. 10 illustrates example operations 1000 performed, for example, by a UE for quickly finding a reliable downlink beam for handover, in accordance with certain aspects of the present disclosure.

FIG. 10 illustrates example operations 1000 performed, for example, by a UE for quickly finding a reliable downlink beam for handover, in accordance with certain aspects of the present disclosure.

Operations 1000 begin, at 1002, by measuring a plurality of candidate downlink beams of a target BS, wherein measurement opportunities for each of the candidate downlink beams are scheduled periodically. At 1004, the UE reports measurements relating to one or more of the measured candidate downlink beams to a source BS. At 1006, the UE receives a command to handover to the target BS. At 1008, in response to receiving the command, the UE attempts to find a new downlink beam of the target BS having a corresponding measurement opportunity that is earlier than a next measurement opportunity of one of the one or more candidate downlink beams.

In certain aspects, each measurement opportunity corresponding to a downlink beam includes a downlink symbol of a special subframe (e.g., sync subframe) configured for transmitting beam reference symbols. In an aspect, each measurement opportunity for the same downlink beam includes a symbol of the same symbol index in a subframe of the same subframe index in a radio frame (e.g., system frame as discussed above).

In certain aspects, once the handover to the target BS is triggered (e.g., the UE receives the handover command), the UE, instead of waiting for a next measurement opportunity (e.g., BRS symbol/subframe location) of a candidate downlink beam which the UE reported earlier, starts searching for a downlink beam (e.g., BRSs) of the target BS in all symbols after the handover is triggered, in an attempt to find a good downlink beam earlier than one of the reported candidate beams. In an aspect, if the UE successfully finds a new downlink beam (e.g., not a reported candidate beam) of the target BS before detecting one of the reported candidate downlink beams, and determines that the quality of the new downlink beam is good enough for communication with the target BS, the UE completes the handover using the new downlink beam. This way the UE finds the first good enough downlink beam for handover to the BS and may potentially complete the handover earlier and minimize handover delay. In an aspect, the UE searches all symbols including the symbols corresponding to the reported candidate downlink beams. In an aspect, the UE uses a particular detected downlink beam (including the reported candidate downlink beams) for the handover only if the quality of the beam satisfies a quality metric (e.g., receive signal threshold). In certain aspects, since the UE measures all detected BRSs for quality of detected downlink beams instead directly using a previously reported candidate beam, deteriorated quality of reported candidate downlink beams (e.g., as a result of high UE mobility) is no more an issue.

Figure 11:
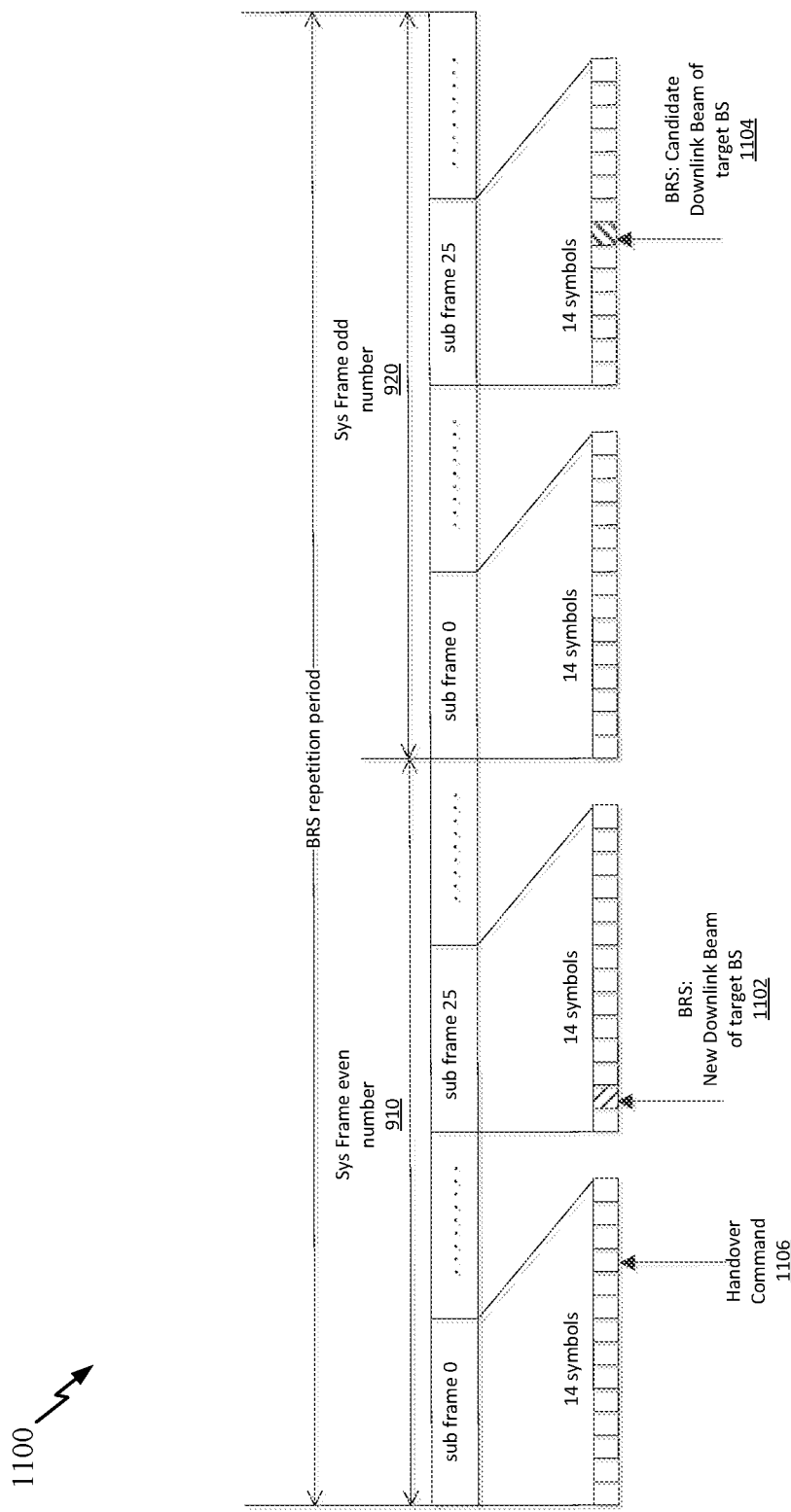
FIG. 11 illustrates an example 1100 of quick detection of a good downlink beam for handover, in accordance with certain aspects of the present disclosure To facilitate understanding, identical reference numerals have been used, where possible, to designate identical elements that are common to the figures. It is contemplated that elements disclosed in one aspect may be beneficially utilized on other aspects without specific recitation.

FIG. 11 illustrates an example 1100 of quick detection of a good downlink beam for handover, in accordance with certain aspects of the present disclosure.

In the Examiner 1100, the candidate downlink beam 1104 of a target BS is transmitted with a repetition period of 20 ms. Thus, BRS corresponding to the candidate downlink beam 1104 is transmitted every 20 ms. As shown, as a result of the 20 ms BRS repetition period, the BRS corresponding to the candidate downlink beam 1104 is transmitted in the seventh symbol of sync subframe 25 in alternate system frames (e.g., system frame 920), one system frame being 10 ms in length. As noted above, the UE is generally configured to continually detect and measure downlink beams from the target BS and report one or more of the measured downlink beams to the source/serving BS. For easy illustration, the example 1100 assumes that UE reported only one candidate downlink beam 1104 to the source BS. However, it may be appreciated that the UE may report multiple candidate downlink beam of the target BS. In an aspect, the UE records the symbol/subframe location of the candidate downlink beam 1104 for use during a handover to the target BS.

The UE receives a handover command 1106 from the source BS in the 11$^{th}$ symbol of sync subframe 0 in system frame 910, for a handover to the target BS. It may be noted that while the example shown the UE receiving the handover command 1106 in a sync subframe, the UE may receive a handover command in any symbol of any subframe of a system frame. In accordance with current systems, once the handover command is received, the UE will have to wait until the 7$^{th}$ symbol of sync subframe 25 of the next system frame 920 to detect and use the candidate downlink beam 1104 for the handover. As noted above, the UE already knows the BRS location of the candidate downlink beam 1104 from the previous measurement used for reporting the candidate downlink beam 1104. Further, if the candidate downlink beam 1104 has deteriorated below a threshold quality, the handover may be delayed or may fail.

In certain aspects, in accordance with the techniques for quickly detecting a good downlink beam as discussed above, the UE, instead of waiting for the BRS opportunity of the candidate downlink beam 1104, starts searching for a downlink beam that is good enough for handing over to the target BS soon after the handover command is received. For example, the UE searches every symbol of every sync subframe (e.g., sync subframes 0 and 25) for BRSs corresponding downlink beams of the target BS. If the UE finds a BRS corresponding to a downlink beam of the target BS in a particular symbol, the UE measures the beam to check if it can be used for handover to the target BS. The UE uses the detected downlink beam for the handover only if the beam's quality satisfies a quality threshold.

As shown in example 1100, the UE detects a new downlink beam 1102 in the 2$^{nd}$ symbol of sync subframe 25 in system frame 910. Thus, assuming that the new downlink beam 1102 is of acceptable quality, the UE may complete the handover much earlier as compared to waiting and attempting to use the candidate downlink beam 1104 for the handover. Additionally, as the UE measures each detected BRS, the UE ensures that the beam used for the handover is of good quality. Thus, the UE is able to handover to the target BS using the first available downlink beam that satisfies a quality threshold.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a User Equipment (UE), comprising:
    measuring a plurality of candidate downlink beams of a target base station (BS), wherein measurement opportunities for each of the candidate downlink beams are scheduled periodically;
    reporting measurements relating to one or more of the measured candidate downlink beams to a source BS;
    receiving a command to handover to the target BS; and
    in response to receiving the command, searching for a new downlink beam of the target BS having a corresponding measurement opportunity that is earlier than a next measurement opportunity of one of the reported one or more candidate downlink beams.

2. The method of claim 1, wherein searching for the new downlink beam comprises searching all downlink symbols of at least one special subframe configured for transmission of beam reference signals in an attempt to find a beam reference signal corresponding to a downlink beam of the target BS.

3. The method of claim 1, further comprising:
    measuring the new downlink beam;
    determining that the new downlink beam can be used for communicating with the target BS; and
    establishing communication with the target BS using the new downlink beam for the handover.

4. The method of claim 3, wherein measuring the new downlink beam comprises measuring a beam reference signal corresponding to the new downlink beam in the corresponding measurement opportunity.

5. The method of claim 3, wherein determining that the new downlink beam can be used for communicating with the target BS comprises determining that the quality of the new downlink beam is above a threshold quality for the communication.

6. The method of claim 1, wherein a measurement opportunity corresponding to a downlink beam comprises a downlink symbol of a special subframe configured for transmitting beam reference symbols, wherein each measurement opportunity for the same downlink beam comprises a symbol of the same symbol index in a subframe of the same subframe index in a radio frame.

7. The method of claim 1, wherein the new downlink beam is not one of the one or more candidate downlink beams reported to the source BS.

8. An apparatus for wireless communication by a User Equipment (UE), comprising:
means for measuring a plurality of candidate downlink beams of a target base station (BS), wherein measurement opportunities for each of the candidate downlink beams are scheduled periodically;
means for reporting measurements relating to one or more of the measured candidate downlink beams to a source BS;
means for receiving a command to handover to the target BS; and
means for, in response to receiving the command, searching for a new downlink beam of the target BS having a corresponding measurement opportunity that is earlier than a next measurement opportunity of one of the reported one or more candidate downlink beams.

9. The apparatus of claim 8, wherein the means for searching for the new downlink beam searches all downlink symbols of at least one special subframe configured for transmission of beam reference signals in an attempt to find a beam reference signal corresponding to a downlink beam of the target BS.

10. The apparatus of claim 8, further comprising:
means for measuring the new downlink beam;
means for determining that the new downlink beam can be used for communicating with the target BS; and
means for establishing communication with the target BS using the new downlink beam for the handover.

11. The apparatus of claim 10, wherein the means for measuring the new downlink beam measures a beam reference signal corresponding to the new downlink beam in the corresponding measurement opportunity.

12. The apparatus of claim 10, wherein the means for determining that the new downlink beam can be used for communicating with the target BS determines that the quality of the new downlink beam is above a threshold quality for the communication.

13. The apparatus of claim 8, wherein a measurement opportunity corresponding to a downlink beam comprises a downlink symbol of a special subframe configured for transmitting beam reference symbols, wherein each measurement opportunity for the same downlink beam comprises a symbol of the same symbol index in a subframe of the same subframe index in a radio frame.

14. The apparatus of claim 8, wherein the new downlink beam is not one of the one or more candidate downlink beams reported to the source BS.

15. An apparatus for wireless communication by a User Equipment (UE), comprising:
at least one processor configured to:
measure a plurality of candidate downlink beams of a target base station (BS), wherein measurement opportunities for each of the candidate downlink beams are scheduled periodically;
report measurements relating to one or more of the measured candidate downlink beams to a source BS;
receive a command to handover to the target BS; and
in response to receiving the command, searching for a new downlink beam of the target BS having a corresponding measurement opportunity that is earlier than a next measurement opportunity of one of the reported one or more candidate downlink beams; and
a memory coupled to the at least one processor.

16. The apparatus of claim 15, wherein the at least one processor searches for the new downlink beam by searching all downlink symbols of at least one special subframe configured for transmission of beam reference signals in an attempt to find a beam reference signal corresponding to a downlink beam of the target BS.

17. The apparatus of claim 15, wherein the at least one processor is further configured to:
measure the new downlink beam;
determine that the new downlink beam can be used for communicating with the target BS; and
establish communication with the target BS using the new downlink beam for the handover.

18. The apparatus of claim 17, wherein the at least one processor measures the new downlink beam by measuring a beam reference signal corresponding to the new downlink beam in the corresponding measurement opportunity.

19. The apparatus of claim 17, wherein the at least one processor determines that the new downlink beam can be used for communicating with the target BS by determining that the quality of the new downlink beam is above a threshold quality for the communication.

20. The apparatus of claim 15, wherein a measurement opportunity corresponding to a downlink beam comprises a downlink symbol of a special subframe configured for transmitting beam reference symbols, wherein each measurement opportunity for the same downlink beam comprises a symbol of the same symbol index in a subframe of the same subframe index in a radio frame.

21. The apparatus of claim 15, wherein the new downlink beam is not one of the one or more candidate downlink beams reported to the source BS.

22. A computer-readable medium for wireless communication by a User Equipment (UE), the computer-readable medium storing instructions which when processed by at least one processor performs a method comprising:
measuring a plurality of candidate downlink beams of a target base station (BS), wherein measurement opportunities for each of the candidate downlink beams are scheduled periodically;
reporting measurements relating to one or more of the measured candidate downlink beams to a source BS;
receiving a command to handover to the target BS; and
in response to receiving the command, searching for a new downlink beam of the target BS having a corresponding measurement opportunity that is earlier than a next measurement opportunity of one of the reported one or more candidate downlink beams.

23. The computer-readable medium of claim 22, wherein searching for the new downlink beam comprises searching all downlink symbols of at least one special subframe configured for transmission of beam reference signals in an attempt to find a beam reference signal corresponding to a downlink beam of the target BS.

24. The computer-readable medium of claim 22, further comprising instructions for:
measuring the new downlink beam;
determining that the new downlink beam can be used for communicating with the target BS; and
establishing communication with the target BS using the new downlink beam for the handover.

25. The computer-readable medium of claim 24, wherein measuring the new downlink beam comprises measuring a beam reference signal corresponding to the new downlink beam in the corresponding measurement opportunity.

26. The computer-readable medium of claim 24, wherein determining that the new downlink beam can be used for communicating with the target BS comprises determining that the quality of the new downlink beam is above a threshold quality for the communication.

27. The computer-readable medium of claim 22, wherein a measurement opportunity corresponding to a downlink beam comprises a downlink symbol of a special subframe configured for transmitting beam reference symbols, wherein each measurement opportunity for the same downlink beam comprises a symbol of the same symbol index in a subframe of the same subframe index in a radio frame.

28. The computer-readable medium of claim 22, wherein the new downlink beam is not one of the one or more candidate downlink beams reported to the source BS.

* * * * *